United States Patent [19]
Byun

[11] Patent Number: 5,464,478
[45] Date of Patent: Nov. 7, 1995

[54] METHOD OF RUBBING AN ORIENTATION CONTROLLING FILM OF A LIQUID CRYSTAL DISPLAY IN DEIONIZED WATER

[75] Inventor: Yong S. Byun, Seoul, Rep. of Korea

[73] Assignee: Goldstar Co., Ltd., Seoul, Rep. of Korea

[21] Appl. No.: 174,002

[22] Filed: Dec. 28, 1993

[30] Foreign Application Priority Data

Dec. 28, 1992 [KR] Rep. of Korea ............... 1992-25828

[51] Int. Cl.$^6$ ........................... B08B 3/12; G02F 1/13
[52] U.S. Cl. ............................ 134/1; 359/76
[58] Field of Search ................... 134/1; 359/75, 359/76

[56] References Cited

U.S. PATENT DOCUMENTS

| | | | |
|---|---|---|---|
| 3,898,351 | 8/1975 | Kennison et al. | 134/1 X |
| 3,973,057 | 8/1976 | Channin et al. | 427/162 |
| 4,412,724 | 11/1983 | Sandhu | 359/76 X |
| 4,906,311 | 3/1990 | Gurol | 156/89 |
| 5,075,790 | 12/1991 | Hayashi et al. | 359/76 |
| 5,221,981 | 6/1993 | Kodera et al. | 359/76 |
| 5,288,333 | 2/1994 | Tanaka et al. | 134/31 |

Primary Examiner—Jan H. Silbaugh
Assistant Examiner—Saeed Chaudhry
Attorney, Agent, or Firm—Jacobson, Price, Holman & Stern

[57] ABSTRACT

A method of rubbing an orientation controlling film of a liquid crystal display, wherein a glass substrate on which an orientation controlling film is printed, is disposed in a bath, and the glass substrate is rubbed with the deionized water being supplied to be washed by means of the deionized water and ultrasonic waves, and then the deionized water is discharged from the bath and the glass substrate is dried. The production of electrostatic charge on the orientation controlling film can be restrained, and the processing step can be reduced because the rubbing and the washing are performed simultaneously, thereby the quality of the liquid crystal display element can be improved.

1 Claim, 1 Drawing Sheet

METHOD OF RUBBING AN ORIENTATION CONTROLLING FILM OF A LIQUID CRYSTAL DISPLAY IN DEIONIZED WATER

BACKGROUND OF THE INVENTION

1. Technical Field

The present invention relates to a method of rubbing an orientation controlling film of liquid crystal display and the device thereof, and more particularly to a method of rubbing an orientation controlling film of a liquid crystal display and the device thereof, in which the orientation controlling film of a liquid crystal display is rubbed while being washed using deionized water.

2. Prior Art

According to the conventional method of manufacturing a liquid crystal display, transparent electrodes 2 and orientation controlling films 3 are formed on an upper and a lower substrate 1 and the orientation controlling films 3 are rubbed in a predetermined direction, and liquid crystal 5 is injected in a space defined by an upper and a lower substrate 1 and sealing material 4, and then a liquid crystal display is completed, as shown in FIG. 1. Especially, in the method of rubbing orientation controlling film of a liquid crystal display, as shown in FIG. 2, an orientation controlling film 3 is evaporated on a glass substrate 8 and the surface of the orientation controlling film 3 is rubbed in a predetermined direction so as to orient liquid crystal, by means of a rubbing device which comprises a rotating mechanism 10 for determining a desired rubbing direction, a table 9 for vacuum-adsorbing a glass substrate 8, a rubbing roller 6 having a rubbing cloth, and an electric charge eliminating device 7.

However, in the above-mentioned conventional method of rubbing orientation controlling film, because the glass substrate is exposed to air and is rubbed by the abrasion by the rotation of the rubbing roller, electrostatic charge is apt to be charged on the glass substrate, and the orientation controlling film or the liquid crystal display driving element, such as thin film transistor (TFT), is apt to be destroyed in the process of discharging the charged electrostatic charge on the glass substrate. And, because pieces of rubbing cloth accumulate on the glass substrate after rubbing, a washing process is required to eliminate them, and thereby the manufacturing process becomes complicated.

SUMMARY OF THE INVENTION

It is an object of the present invention to provide a method of rubbing an orientation controlling film of a liquid crystal display and the device thereof, which prevents the production of the electrostatic charge on an orientation controlling film and reduces the manufacturing process.

To achieve the above object, the present invention provides a method of rubbing an orientation controlling film of a liquid crystal display comprising the steps of:

disposing a glass substrate, on which an orientation controlling film is printed, in a bath;

rubbing the glass substrate with supplying deionized water to be washed by means of the deionized water and ultrasonic waves; and discharging the deionized water from the bath and drying the glass substrate.

The present invention also provides a device of rubbing an orientation controlling film of a liquid crystal display comprising:

a bath in which deionized water is charged or from which deionized water is discharged;

carriers for reciprocating the glass substrate horizontally in the bath;

a plurality of ultrasonic vibrators attached to the bath to produce ultrasonic waves;

a brush and rubbing roller for rubbing an orientation controlling film formed on the glass substrate;

a rotating and moving mechanism for rotating and moving the brush and rubbing roller upward and downward;

a deionized water supplying mechanism disposed at one side of the rotating and moving mechanism to supply deionized water to the glass substrate; and an air knife nozzle disposed at the opposite side of the deionized water supplying mechanism to dry the rubbed and washed glass substrate.

BRIEF DESCRIPTION OF THE DRAWINGS

The above object and other features and advantages of the present invention will be apparent by describing the preferred embodiment of the present invention hereinafter with reference to the drawings, in which.

DETAILED DESCRIPTION OF THE PREFERRED EMBODIMENT OF THE PRESENT INVENTION

Figure 1:
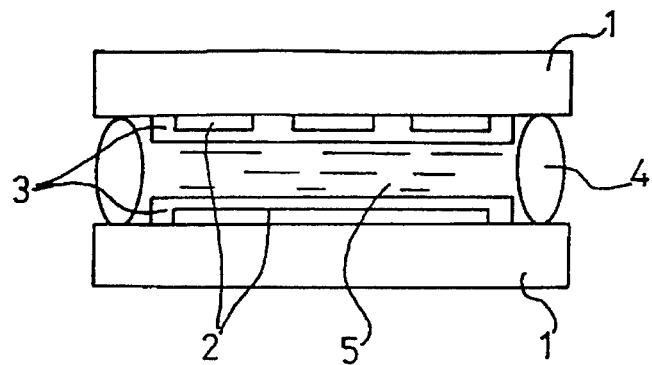
FIG. 1 shows the construction of a conventional liquid crystal display.
Figure 2:
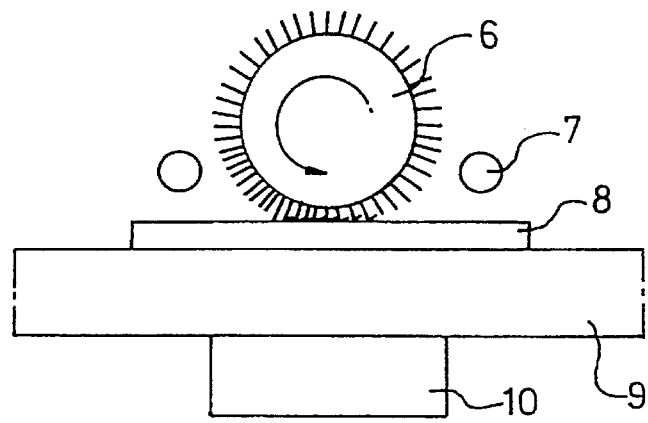
FIG. 2 shows the construction of a conventional device for rubbing an orientation controlling film.
Figure 3:
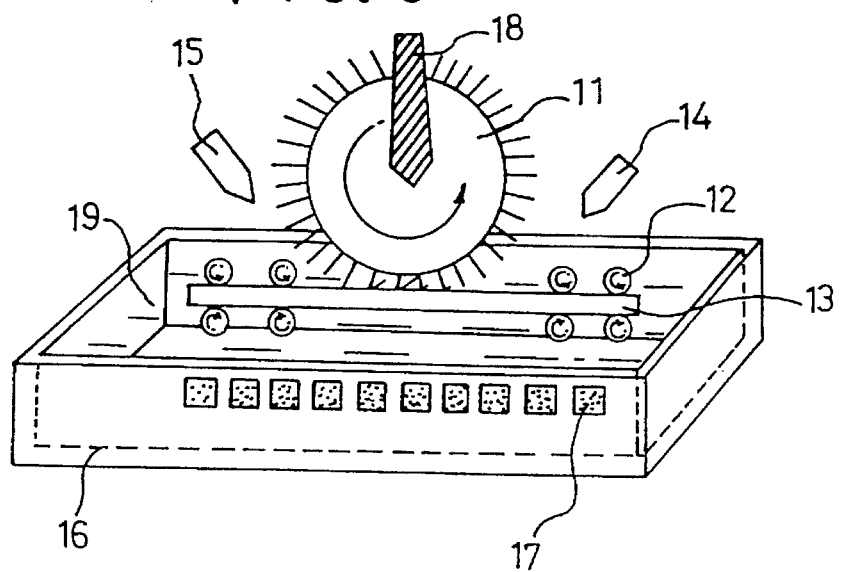
FIG. 3 shows the construction of a device of rubbing an orientation controlling film according to the present invention.

FIG. 3 shows the construction of a rubbing device according to the present invention. The rubbing device of the present invention comprises a brush and rubbing roller 11 for directly rubbing an orientation controlling film formed on the glass substrate, a rotating and moving mechanism for rotating and moving the brush and rubbing roller 11 upward and downward, carriers 12 for carrying the glass substrate 13 horizontally, and a bath 16 in which deionized water is charged or from which deionized water is discharged so as to perform rubbing and to simultaneously wash ultrasonically. The device further comprises a plurality of ultrasonic vibrators 17 attached to the bath 16 to produce ultrasonic waves, a deionized water supplying mechanism 15 disposed at one side of the rotating and moving mechanism to supply deionized water 19 to the glass substrate 13 so that the glass substrate is washed and the production of the electrostatic charge is restrained in rubbing, and an air knife nozzle disposed at the opposite side of the deionized water supplying mechanism 15 to dry the rubbed and washed glass substrate 13.

A rubbing method by the rubbing device having the above-mentioned construction will be described hereinafter. The glass substrate 13, on which the orientation controlling film is printed, is disposed under the brush and rubbing roller 11 by means of the carriers 12, the brush and rubbing roller 11 is moved and rotated by the rotating and moving mechanism 18 with the deionized water supplied through the deionized water supplying mechanism 15. The rubbing is performed through the above process, and at the same time, the glass substrate 13 is washed in the bath 16 by means of the deionized water 19 and the ultrasonic vibrator 17 and is dried by the air knife nozzle. In this case, the desired rubbing direction can be determined by enabling the 360° rotation and the up-and-down movement of the brush and rubbing roller 11, and the rubbing density can be changed by the regulation of the rotation rpm of the carriers.

According to the method of rubbing an orientation controlling film of a liquid crystal display and the device there of according to the present invention as described above, because the rubbing is performed by a wet-rubbing method, the electrostatic charge can be solved, and because the rubbing and the washing are performed simultaneously, the processing step can be reduced, and thereby the quality of goods can be improved and the rate of manufacturing goods can be increased.

What is claimed is:

1. A method of rubbing an orientation controlling film printed on a glass substrate of a liquid crystal display using a rubbing roller, comprising the steps of:

disposing the glass substrate on which the orientation controlling film is printed in a bath containing deionized water;

rubbing and washing the glass substrate by rubbing the glass substrate with the rubbing roller in the deionized water and simultaneously supplying ultrasonic waves to the deionized water; and discharging the deionized water from the bath and drying the glass substrate.

* * * * *